(12) United States Patent
Zhang et al.

(10) Patent No.: US 9,021,256 B2
(45) Date of Patent: Apr. 28, 2015

(54) SYSTEM AND METHODS TO PERFORM PUBLIC KEY INFRASTRUCTURE (PKI) OPERATIONS IN VEHICLE NETWORKS USING ONE-WAY COMMUNICATIONS INFRASTRUCTURE

(71) Applicant: Telcordia Technologies, Inc., Piscataway, NJ (US)

(72) Inventors: Tao Zhang, Fort Lee, NJ (US); Hyong-Sop Shim, Basking Ridge, NJ (US); Stanley Pietrowicz, Freehold, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 13/943,509

(22) Filed: Jul. 16, 2013

(65) Prior Publication Data
US 2013/0305043 A1    Nov. 14, 2013

Related U.S. Application Data

(62) Division of application No. 12/872,541, filed on Aug. 31, 2010, now Pat. No. 8,522,013.

(51) Int. Cl.
*H04L 29/06* (2006.01)
*H04L 9/32* (2006.01)
*H04W 4/20* (2009.01)
*H04W 12/04* (2009.01)
*H04W 4/04* (2009.01)

(52) U.S. Cl.
CPC ............... *H04L 9/3268* (2013.01); *H04L 63/20* (2013.01); *H04W 4/046* (2013.01); *H04W 4/20* (2013.01); *H04W 12/04* (2013.01)

(58) Field of Classification Search
CPC ..................................................... H04L 9/3268
USPC ........................................................ 713/158
See application file for complete search history.

(56) References Cited

U.S. PATENT DOCUMENTS

| 2004/0125959 A1 | 7/2004 | Beuque et al. |
| 2005/0220304 A1 | 10/2005 | Lenoir et al. |
| 2006/0256967 A1 | 11/2006 | Beuque et al. |
| 2006/0259771 A1 | 11/2006 | Beuque et al. |
| 2007/0011116 A1 | 1/2007 | Vauclair et al. |

(Continued)

OTHER PUBLICATIONS

International Application No. PCT/US2010/047286—PCT International Search Report dated Oct. 12, 2010.

*Primary Examiner* — Michael S McNally (57) ABSTRACT

A set of certificate management methods designed to significantly reduce or eliminate reliance on infrastructure network connectivity after vehicles are sold uses techniques to support certificate management operations in order to reduce the frequency which vehicles need to communicate with the Certificate Authorities (CAs) and the amount of data that needs to be exchanged between vehicles and the CA. These methods include, for example, approaches to use one-way communications and vehicle-to-vehicle (V2V) communications to replace expired certificates, approaches to use one-way communications and V2V communications to replace revoked certificates, and use of a small subset of vehicles as proxies to help retrieve and distribute Certificate Revocation Lists (CRLs) and replacement certificates. The combination of these techniques leads to solutions that can eliminate the need for roadside infrastructure networks completely.

17 Claims, 4 Drawing Sheets

(56) References Cited

U.S. PATENT DOCUMENTS

| | | |
|---|---|---|
| 2007/0022469 A1 | 1/2007 | Cooper et al. |
| 2007/0025552 A1 | 2/2007 | Beuque et al. |
| 2007/0025553 A1 | 2/2007 | Beuque et al. |
| 2007/0223702 A1* | 9/2007 | Tengler et al. ............... 380/270 |
| 2008/0232583 A1* | 9/2008 | Di Crescenzo et al. ......... 380/44 |
| 2008/0232595 A1* | 9/2008 | Pietrowicz et al. ........... 380/277 |
| 2008/0235509 A1* | 9/2008 | Laberteaux et al. .......... 713/156 |
| 2008/0263354 A1 | 10/2008 | Beuque et al. |
| 2008/0307508 A1 | 12/2008 | Conley et al. |
| 2009/0179775 A1* | 7/2009 | Bos ............................... 340/905 |
| 2009/0201139 A1 | 8/2009 | Zimmermann et al. |

\* cited by examiner

SYSTEM AND METHODS TO PERFORM PUBLIC KEY INFRASTRUCTURE (PKI) OPERATIONS IN VEHICLE NETWORKS USING ONE-WAY COMMUNICATIONS INFRASTRUCTURE

CROSS-REFERENCE TO RELATED APPLICATIONS

This application is a divisional of pending U.S. patent application Ser. No. 12/872,541, filed Aug. 31, 2010. This application claims the benefit of U.S. Provisional Application No. 61/238,681, filed on Aug. 31, 2009, which is incorporated by reference herein in its entirety.

FIELD OF THE INVENTION

The present invention relates to security solutions for vehicle-to-vehicle communications. Specifically, the invention relates to digital key and certificate management for vehicle communications, Public Key Infrastructure or PKI for vehicle communications, security, vehicle safety applications, and privacy.

BACKGROUND OF THE INVENTION

A prerequisite for real-world deployment of vehicle-to-vehicle (V2V) communications applications is a security system that can support critical functions such as message authentication and driver privacy. The foundation for enabling these security functions is a vehicular public-key infrastructure (also referred to as certificate management system) to create, authorize, assign, and manage the security keys and their digital certificates used by vehicles throughout their lifecycles. Conventional certificate management systems rely on Certificate Authorities (CAs), which are servers typically connected to terrestrial infrastructure networks, to create and issue certificates, detect and revoke misused certificates, distribute certificate revocation lists to notify users of the revoked certificates, and replace expired and revoked certificates. This means that vehicles using such conventional certificate management methods have to rely on infrastructure network connectivity to communicate with CAs for their certificate management needs.

Prior-art PKI solutions for vehicle communications require vehicles to communicate frequently with infrastructure-based Certificate Authorities using two-way communications. This will require the deployment of large-scale new roadside radio networks or equipping a high percentage of vehicles with existing long-rang two-way communications capabilities (e.g., cellular), which can be highly costly and can take a long time to achieve.

Digital certificates and the Public Key Infrastructure (PKI), which is today's most prevailing certificate management system, provide a foundation for securing vehicle communications. However, using a conventional certificate management system requires vehicles to have frequent infrastructure network connectivity to communicate with Certificate Authorities (CAs) to:
  Obtain initial security keys and their certificates.
  Obtain replacement keys and certificates for expired and revoked certificates.
  Send information to the CAs (or separate malicious behavior detection servers), which can be used by the CAs to detect security attacks.
  Obtain Certificate Revocation Lists (CRLs) from the CAs.

Here, infrastructure networks refer to any roadside short-range radio networks (e.g., DSRC) or cellular networks, which vehicles can use to communicate with fixed servers. Providing frequent infrastructure network connectivity nationwide to all vehicles (e.g., by establishing roadside DSRC networks or using cellular networks) can be highly costly.

SUMMARY OF THE INVENTION

The present invention significantly reduces or eliminates the reliance on infrastructure network connectivity to provide security services to vehicles communications applications.

The prior art, in general, assumes that two-way communications are necessary to support the major PKI operations such as replacing expired and revoked certificates. The present methods use one-way infrastructure-to-vehicle communications to support PKI operations including supporting the replacement of expired and revoked certificates and distribution of CRLs.

The invention presents a set of certificate management methods designed to significantly reduce or eliminate reliance on infrastructure network connectivity. The methods use the following main principles:
  Use one-way communications and V2V communications to replace expired certificates.
  Use one-way communications and V2V communications to replace revoked certificates.
  Use a small subset of vehicles as proxies to help retrieve and distribute CRLs and replacement certificates.
  Use of one-way infrastructure-to-vehicle communications to support PKI operations for vehicles reduces or removes the needs for road-side infrastructure networks and allows PKI operations for vehicles to be supported using existing one-way broadcast network services, such as satellite broadcast radios, which are already widely available in vehicles.

The present invention provides novel methods to support these PKI operations using one-way infrastructure-to-vehicle communications.

The invention will be better understood when the following description is read in conjunction with the accompanying drawings.

DETAILED DESCRIPTION

Digital certificates and the Public Key Infrastructure (PKI) provide a foundation for securing vehicle communications. However, prior-art PKI systems require vehicles to have frequent two-way vehicle-to-infrastructure communications with Certificate Authorities (CAs) to support the PKI operations. Infrastructure or infrastructure networks refer to any roadside short-range radio networks (e.g., those using the Dedicated Short-Range Communications or DSRC radio, or WiFi radio) or cellular networks that vehicles can use to communicate with back-end servers.

PKI operations typically supported using two-way communications with the CA in prior-art PKI systems include:

Obtain initial security keys and their certificates.

Obtain replacement keys and certificates for expired and revoked certificates.

Obtain Certificate Revocation Lists (CRLs) from the CAs.

The initial security keys and certificates can be assigned and installed on vehicles during the vehicle manufacturing process or at the vehicle dealerships before vehicles are sold, and therefore generally do not demand infrastructure network connectivity along roadways.

Certificates usually have an expiration time to prevent security keys from remaining valid for forever and to prevent CRLs from monotonically grow without bound. When certificates expire, vehicles need to obtain new keys and certificates from the Certificate Authority to replace the expired keys.

When a certificate is determined to be used in malicious activities, it can be revoked by the CA. CRLs are the primary means used in a PKI system to revoke certificates. Vehicles receiving data secured by a certificate will check the CRL to determine if the certificate has been revoked. Vehicles therefore need to obtain update-to-date CRLs because CRLs change over time as certificates are revoked.

When one or more certificates used by a vehicle have been revoked, these revoked certificates need to be replaced. When a vehicle's privilege to receive certificates has been rescinded, this vehicle should no longer be able to receive new replacement certificates.

Figure 1:
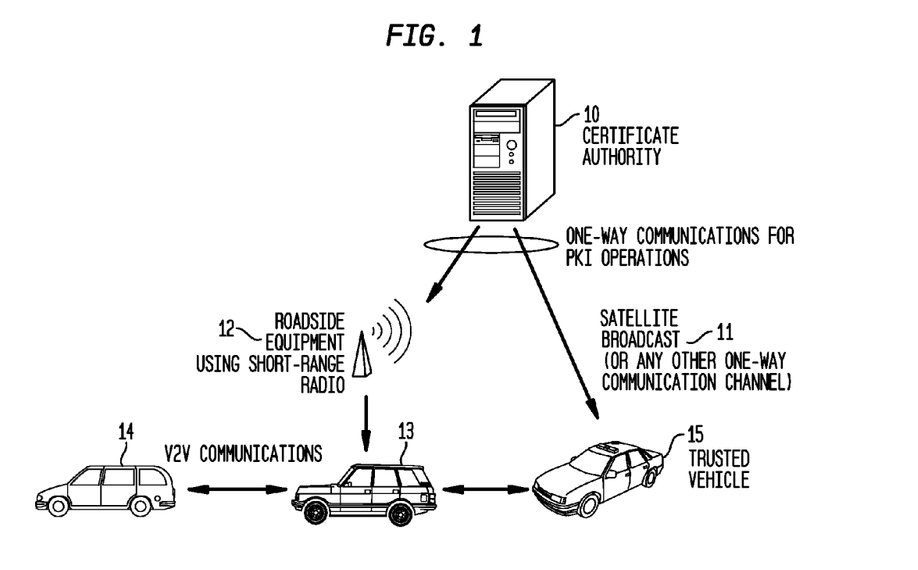
FIG. 1 shows a schematic representation of simplified system architecture.

CRL Distribution Using One-Way Infrastructure-to-Vehicle Communication:

Referring to FIG. 1, a simplified system architecture useful for practicing the invention is shown. CRLs are public data to be openly distributed to any entity that needs them. They are digitally signed by the CA 10 to ensure data integrity and authenticity. The present invention considers the following novel methods to use one-way infrastructure-to-vehicle communications to distribute CRLs to vehicles:

[1]. CRL Seeding with V2V Distribution

[2]. CRL Distribution via Satellite One-Way Broadcast 11 or the like

[3]. Mobile Infrastructure Access Points 12

These methods can be used in combination to improve the timeliness of CRL distribution and coverage in the population of vehicles.

CRL Seeding with V2V Distribution:

This method is to seed some vehicles 13 with the latest CRL and enable these vehicles to propagate the CRL to other vehicles 14 using V2V communications. A convenient seeding mechanism is to load the latest CRL in new vehicles before the vehicles are sold. Each year approximately 10 to 15 million new vehicles are sold in the US. Loading the current CRL to these new vehicles will allow the new vehicles to rapidly spread the CRLs to the rest of the vehicles. With about 250 million vehicles on the roads and assuming relatively uniform renewal rates throughout the country, this means there will be a seed vehicle in each neighborhood community of only about 200 vehicles. During each trip of a new vehicle carrying the new CRL, it is highly likely that the new vehicle will "meet" tens to hundreds of other vehicles and therefore be able to give the CRL to them.

Another method of seeding is to deploy the latest CRL on special trusted vehicles 15 such as police vehicles, emergency vehicles, and buses and taxis. These trusted vehicles can then distribute the CRL to other vehicles via V2V communications. This could also be applied to vehicle fleets, such as letter and package delivery services (e.g., USPS, UPS, and FedEx), public service vehicles, such as buses, trolleys, light rail systems, and trains.

Figure 2:
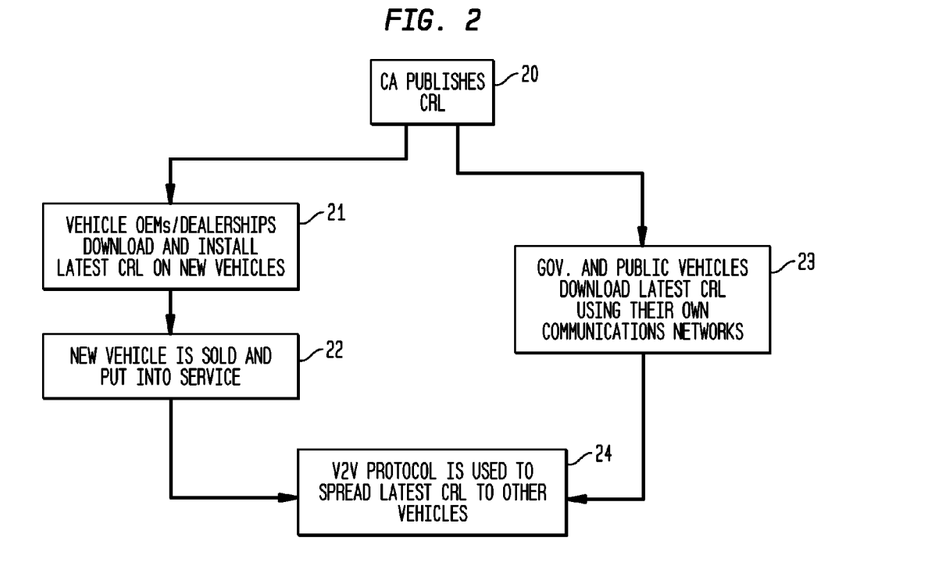
FIG. 2 is a flow chart of CRL distribution with seeding and V2V communications.

FIG. 2 shows a flow chart of CRL distribution with seeding and V2V communications. The CA publishes a CRL 20 that is distributed to vehicle OEMs/dealerships for download and installation of the latest CRL on new vehicles 21. The new vehicle with the certificate is sold and put into service 22. Alternatively, the CA distributes the CRL to trusted vehicles such as government and/or public vehicles for download using a communication network such as a satellite, broadband transmission, cellular towers, private vehicle networks, and the like. V2V communications is used to propagate the latest CRL to other vehicles 24.

Figure 3:
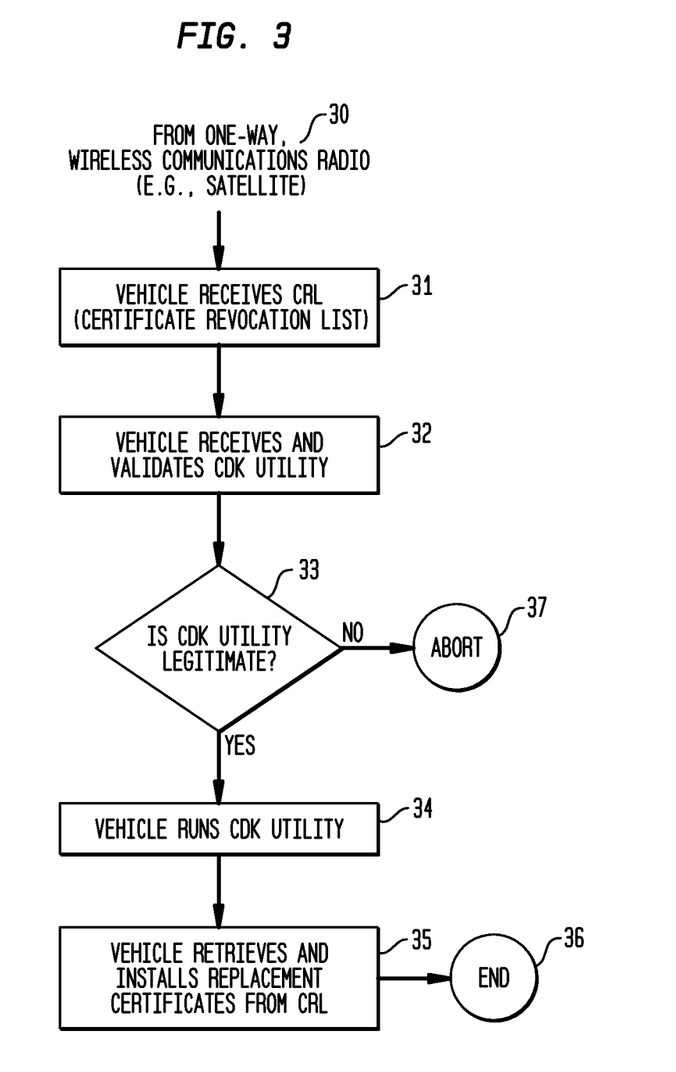
FIG. 3 is a flow chart of revoked certificate replacement with one-way communications and Certificate Decryption Key Utility (CDK) utility application.

CRL Distribution via One-Way Satellite Broadcast:

Referring to FIG. 3, a CRL can be piggybacked on existing one-way radio broadcast services, such as a satellite system and real time traffic information broadcasts over Radio Data Service (RDS), which are already available in vehicles. Today, many vehicles come equipped with satellite radio receivers, such as Sirius XM, to decode digital satellite radio broadcasts. The latest CRL can be periodically broadcast to all vehicles within the coverage area of the satellite. With the current satellites used by the provider Sirius, for instance, at least one of its satellites broadcasts directly over the US at all times, enabling a CRL to be broadcast to the entire vehicle population in a single instance. Due to signal blockage caused by large buildings, natural structures and other facilities (such as indoor and underground parking lots), each CRL may need to be broadcasted multiple times over a period of time to improve coverage. With CRL distribution over RDS, line of sight issues are greatly reduced, enabling vehicles to obtain CRLs as long as they are within the service area of a participating radio station. The coverage areas for terrestrial radio systems is a circular area with a typical radius of 30 to 75 miles.

The vehicle receives the CRL 31 and receives and validates CDK utility 32. A check determines whether the CDK utility is legitimate 33. If the utility is legitimate, the vehicle runs the CDK utility 34. Then, the vehicle retrieves and install replacement certificates from the CRL 35 and the process ends 36. If the CDK utility is not legitimate, the process aborts 37.

The volume of CRL distribution traffic over satellite channels can be minimized using several techniques, such as:

Use smart algorithms to reduce the size of the CRLs.

Reduce the number of times a CRL has to be broadcasted by relying on vehicles who received the CRL to use V2V communications to help distribute it to other vehicles.

Vehicles that have received the latest CRL from its satellite radio can use V2V communications to further distribute the CRL to other vehicles, especially to vehicles that are not equipped with satellite receivers.

CRL Distribution through Trusted Vehicles:

Trusted vehicles such as police, public service, and authorized fleet vehicles that have limited or intermittent back-end connectivity can periodically acquire CRLs and disseminate the CRLs to the vehicle population using V2V communications. Some trusted vehicles, such as police vehicles, may have continuous, but limited communication with back-end infrastructure over which a PKI system can periodically push the most recent CRL. Other vehicles, such fleet vehicles, may only have infrastructure connectivity when returning to the garage at the end of a day. Upon returning and rejoining the network, the PKI system can transmit its latest CRL to the vehicle. As trusted vehicles move among the vehicle population, they propagate the latest CRL to other vehicles using V2V communication. Trusted vehicles thereby provide a means to periodically reseed a portion of the vehicle population by nature of their limited communications and travel paths. With this method, ordinary user vehicles need only possess V2V communication capabilities.

Replacement of Expired Certificates Using One-Way Infrastructure-to-Vehicle Communication:

When a vehicle's certificates expire or are about to expire, the vehicle needs to acquire new replacement certificates from the CA. Using conventional PKI, this process will require two-way vehicle-to-CA communication through the infrastructure networks so that the vehicle and the CA can mutually authenticate each other.

In the present invention, we describe a system and method to replace expired certificates with one-way communications from the CA to the vehicles, using a shared anonymous certificate management scheme where a pool of certificates is shared among the vehicles population as an example.

The CA publishes the list of certificates to be replaced along with their replacement certificates. This list is referred to as the Replacement Certificate List (RCL). The CA can generate this list based on its knowledge of the expiration dates of the certificates and an estimate of how long it takes for the RCL to be distributed to a target percentage of all the vehicles. Expiration of a certificate is not an indication of misuse, but simply a mechanism to help manage CRL growth and provide a means to cleanse the system of certificates that may no longer be in use. The RCL is digitally signed by the CA to ensure the integrity of its content.

The content of each entry on an RCL is meant to be received only by the vehicles that share the replacement certificate. This means that each entry on the RCL should be cryptographically secured so that only the authorized vehicles can decrypt the entry.

Therefore, an entry on a RCL consists of the following elements:

SERIAL_NO: the serial number (or its hash) of a certificate being replaced. This field is shown in clear text on the RCL.

{NEW_CERT}old_k: a new private-public key pair, the corresponding certificate, and the CA's digital signature on the key pair. This field is encrypted with the public key, old_k, of the old certificate that is to be replaced by this new certificate.

When a vehicle receives a RCL, it can quickly determine whether any of its certificates are being replaced by comparing the serial numbers of its certificate with the serial numbers on the RCL. If a match is found, the vehicle uses the private key it currently holds for the certificate undergoing replacement to decrypt the replacement key materials.

Beneficially, only the holder of an expired certificate with serial number SERIAL_NO has the proper private key to decrypt {NEW_CERT} old_k to decrypt the replacement key materials.

Replacement of Revoked Certificates Using One-Way Infrastructure-to-Vehicle Communications:

Conventional PKI solutions require the owner of a revoked certificate to initiate the process of replacing the certificate. This conventional process requires a two-way communication through infrastructure networks between the vehicle (the certificate holder) and the CA during which the vehicle and the CA mutually authenticate each other and then exchange the keying and certificate materials.

Replacement of revoked certificates imposes more security requirements than replacing expired certificates. In particular, a malicious vehicle's right to receive new certificates may have been rescinded, and therefore should not be able to receive new replacement certificates. However, if a malicious vehicle was sharing a revoked certificate with an innocent vehicle, such as when a shared certificate management scheme is used to protect vehicle privacy, the innocent vehicle should be able to receive the replacement certificate while the malicious vehicle should not. The present invention provides two means to distribute replacement key materials to only authorized vehicles, exempting vehicles that have been identified as malicious.

Consider as an example the CA architecture as disclosed in U.S. Patent Application Publication No. 2008/0232595, which is incorporated herein by reference. This CA architecture separates the functions of assigning certificates and authorizing the certificate assignment. That is, an Authorizing CA is responsible for authorizing whether a particular vehicle should be given new certificates. This Authorizing CA knows how many certificates have been assigned to a particular vehicle, but does not know which particular certificates have been assigned to a vehicle. An Assigning CA is responsible for actually assigning certificates to vehicles. It knows which set of certificates are assigned to the same vehicle, but it does not know to which particular vehicle any particular set of certificates has been assigned.

Consider as an example the use of a shared certificate management scheme. Specifically, a small subset of n certificates randomly selected from a pool of N certificates will be assigned to each vehicle. This means that a number of vehicles will be sharing each certificate. In such a system, the set of n certificates assigned to a vehicle forms a unique pseudonym with high probability when N is large (e.g., 10,000).

Figure 4:
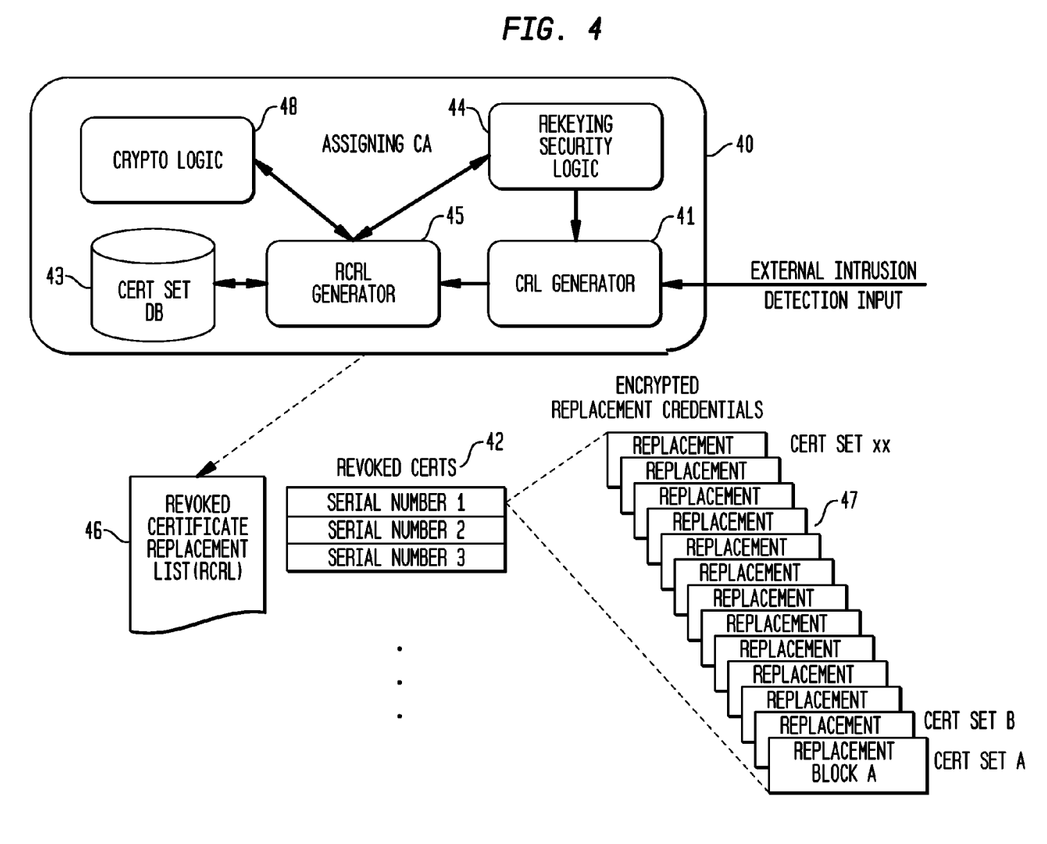
FIG. 4 is a block diagram of the RCRL generator using pseudonym list of vehicles to receive the replacement certificate and interaction with a cryptographic logic function to create the RCRL.

Method 1: Asymmetrically Encrypted Replacement Certificate List:

In FIG. 4 the Assigning CA 40 will be aware of certificates that are placed on the CRL. In the preferred implementation, the Assigning CA contains a CRL generator 41 that creates a list of revoked certificates 42. The CRL generator interacts with internal and external security and intrusion detection functions to invalidate certain certificates by placing them on the CRL. When a new certificate is added to the CRL, the Assigning CA searches its certificate database 43 to identify all certificate sets it has issued to vehicles that contain the revoked certificate. For each certificate set, which is an anonymous pseudonym for a single vehicle, the Assigning CA applies additional rekeying security logic 44 to determine if a replacement certificate should be granted. An example of the rekeying security logic is shown in U.S. Patent Application Publication No. 2008/0232595 where the Assigning CA maintains a rekeying counter for each vehicle pseudonym, increment the rekeying counter each time a vehicle requires a replacement certificate and stop issuing new certificates to a vehicle when its rekeying counter reaches a preset or dynamic threshold. Vehicles are deemed to be misbehaving will be marked not to receive replacement certificates, while the others will be assigned the replacement certificate.

The means by which the Assigning CA selectively provides replacement certificates to some, but not all, vehicles is by the RCRL Generator 45 generating a Revoked Certificate Replacement List (RCRL) 46 as illustrated in the Error! Reference source not found. Error! Reference source not found. The RCRL contains the following two information chunks:

SERIAL_NO: the serial number (or its hash) of a revoked certificate being replaced. This field will be in clear text so that all vehicles can read the serial number, update their CRL and make a determination as to whether or not any of its certificates are undergoing replacement A list of {NEW_CERT}old_k_set: For each revoked certificate serial number, a list of encrypted replacement credentials blocks 47 is provided. Each replacement credentials block contains a replacement anonymous private/public key pair and the corresponding anonymous certificate (which includes the CA's digital signature on the key pair). Although each replacement credentials block will typically contain the same information, each is encrypted with the old public key set (old_k_set=n keys) of a vehicle that possesses the revoked certificate and for which the Assigning CA has authorized a replacement. The encryption function 48 therefore makes use of all n keys to encrypt the replacement credentials block. Vehicles that are not authorized to receive replacement certificate will not find a replacement credentials block with their old key set.

The entire RCRL is digitally signed by the Assigning CA to allow vehicles to authenticate the RCRL source and detect integrity violations.

Figure 5:
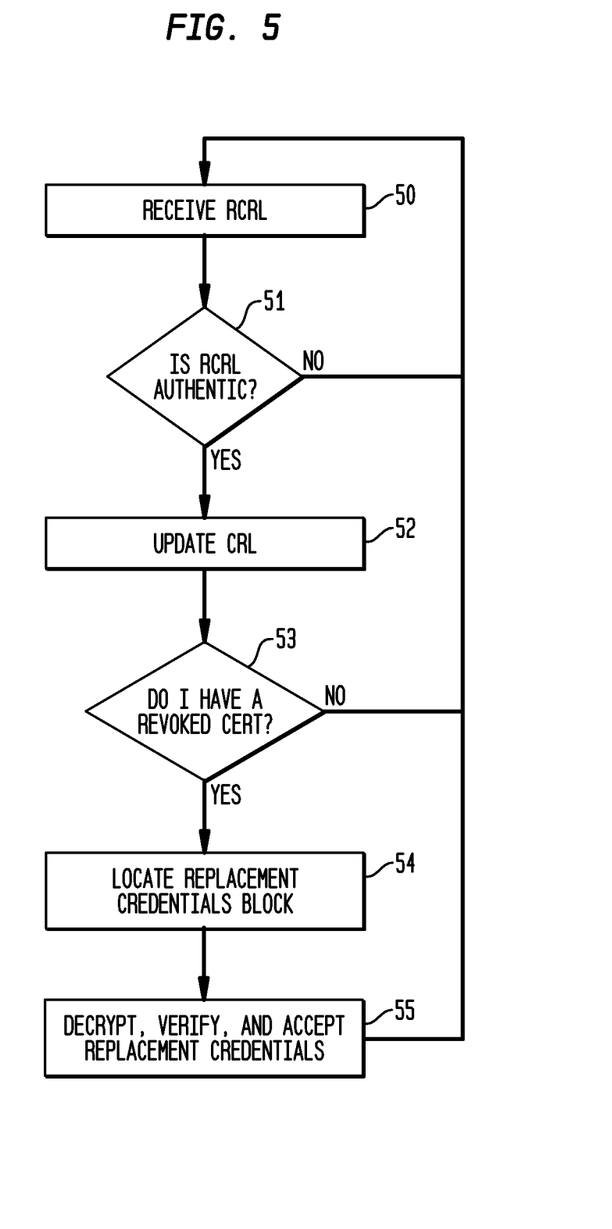
FIG. 5 is a flow chart of processing a Revoked Certificate Replacement List (RCRL).

When a vehicle receives a RCRL 50, it first authenticates the RCRL 51 and, if authentic, updates its local CRL 52 with the new revoked certificate information as shown in Error! Reference source not found. Error! Reference source not found.

The vehicle then determines if it possesses any of the revoked certificates on the RCRL 53 by comparing the serial numbers of its certificates with the serial numbers on the RCRL. If a match is found, the vehicle searches the replacement credentials blocks for the one that was encrypted with its old key set. The process of locating the replacement credentials block 54 can be performed in brute force fashion by attempting to decrypt each credentials block. Only the blocks encrypted with the private key set associated with the vehicle's keys will decrypt properly.

To reduce computation cost by eliminating the brute force search the replacement credentials block can incorporate in clear text an identifier for the certificate set pseudonym. In this preferred implementation, the vehicle would search the list of replacement credentials blocks for a match with its certificate set identifier and attempt to decrypt only that block. Upon finding the appropriate replacement credentials block, the vehicle decrypts, verifies and accepts the replacement certificate 55. If the RCRL is not authentic, or if the vehicle determines it does not possess any of the revoked certificates on the RCRL or after the vehicle decrypts, verifies, and accepts the replacement certificate, the next RCRL is received. 50.

Because the set of n certificates assigned to a vehicle is a unique pseudonym, only those vehicles possessing a set of old certificates that the Assigning CA has authorized to receive the replacement will be able to find and decrypt a replacement credentials block in the RCRL. The Assigning CA will not include an encrypted replacement credentials block for malicious vehicles whose right to receive replacement certificates has been revoked, allowing certificate replacements to be given to only innocent vehicles.

Because the contents of the RCRL are cryptographically secure, RCRLs can be distributed to the vehicle population with the same one-way infrastructure-to-vehicle broadcast, seeding, and/or V2V distribution methods described for CRLs.

Since the RCRL contains the serial number of the revoked certificate, it can also be used to perform incremental updates to local CRLs in vehicles, thereby avoiding large CRL distributions every time a certificate is revoked. At periodic intervals, a complete CRL can be broadcast to make sure that all vehicles have the complete set of revoked certificates.

Method 2: Symmetrically Encrypted Revoked Certificate Replacement List with Certificate Decryption Key Utility:

Because both Assigning CA and vehicles have the private keys for assigned certificates, symmetric encryption can be also be used to lower computational cost. In this method, the RCRL is symmetrically encrypted along with a small Certificate Decryption Key (CDK) utility, i.e., application software generated by the CA and designed to run on the vehicle. Replacement certificates are placed on the RCRL by the CA and encrypted with a symmetric key. As described below, the CDK utility validates that the vehicle it is running on has not been compromised and allows the vehicle to process the RCRL by providing the symmetric key. Specifically, the CDK utility is configured with:

A white list of non-misbehaving vehicles each of which has been assigned a certificate set, in which one or more certificates (but not all of them) have been revoked, and A black list of misbehaving vehicles each of which has been assigned a certificate set, in which one or more certificates (but not all of them) have been revoked.

Each item on the white and black list uniquely identifies a given certificate set and vehicle. Each entry, is cryptographically generated (see below), and referred to as CERT_SET_ID.

CDK utility is further configured with:

A list of tuple {SERIAL_NO, RANDOM}, where SERIAL_NO is the serial number of the revoked certificate to be replaced, and RANDOM is the random value used by the CA to generate the symmetric key to secure the replacement key The CDK utility is signed by the CA to allow vehicles to verify its authenticity.

Both the symmetrically encrypted RCRL and CDK utility can be distributed among vehicles using a one-way broadcast technique, such as seeding with V2V distribution or satellite broadcast. Details of the method are as follows.

The CA creates an RCRL that comprises:

A list of SERIAL_NO: where SERIAL_NO is the serial number (or its hash) of a revoked certificate being replaced A list of {NEW_CERT} k_sym: containing a new anonymous private/public key pair, the corresponding anonymous certificate, and the Anonymous CA's digital signature on the key pair, all of which are symmetrically encrypted with key, k_sym.

The key k_sym is generated by the CA as follows:
1. Concatenate a random value, RANDOM, to the SERIAL_NO of the certificate to be replaced to create a token, t
2. Sign t with the private key of the certificate to be replaced (this value is referred to as t_signed
3. Generate the symmetric key, k_sym, by running t_signed through a hashing algorithm CA generates CERT_SET_ID as follows:
1. Order the certificates in a certificate set to which a certificate to be replaced belongs by, e.g., their serial numbers
2. Sign t_signed with the private key of each certificate in the certificate set in order, the result of which is referred to as CERT_SET_ID If a certificate to be replaced belongs to a certificate set that is determined to belong to a misbehaving vehicle, the certificate set's CERT_SET_ID is put on a black list. Otherwise, the certificate set's CERT_SET_ID is put on a white list.

Subsequently, the CA configures the CDK Utility as previously described and broadcasts the latest RCRL and CDK Utility for a period of time over the one-way communication system 31 (FIG. 3).

To replace revoked certificates, each vehicle receives both the RCRL and CDK utility by a broadcast distribution method. Those vehicles that recognize a serial number on the RCRL as matching one of their certificates check the signature of the CDK utility 32 to verify its authenticity and integrity.

Upon successful verification, the vehicle executes the CDK utility 34, and perform the following steps:

[1]. Vehicle passes the SERIAL_NO of the certificate to replace

[2]. CDK utility generates token, t, by concatenating the SERIAL_NO from the vehicle and RANDOM from a tuple {SERIAL_NO, RANDOM} whose SERIAL_NO matches SERIAL_NO from the vehicle

[3]. CDK utility passes the generated token, t, to the vehicle so that the vehicle can sign t with the private key of the certificate to be replaced

[4]. Vehicle signs t with the private key of the certificate to be replaced (the signed token is referred to as t_signed)

[5]. Vehicle creates a copy of t_signed and creates the CERT_SET_ID for the certificate set to which the certificate to be replaced belongs. Vehicle uses the same algorithm as the one used by the CA

[6]. Vehicle returns both t_signed and CERT_SET_ID to the CDK utility

[7]. CDK utility checks the received CERT_SET_ID against its black list. If found, the CDK utility stops.

[8]. CDK utility checks the received CERT_SET_ID against its white list. If not found, the CDK utility stops.

[9]. Otherwise, the CDK utility generates a symmetric key, k_sym, by running the received t_signed through the same hash function as the one used by the CA

[10]. CDK utility passes k_sym to the vehicle

[11]. Vehicle uses k_sym to decrypt the replacement key material from the RCRL 35.

Other variations of the above vehicle-CDK utility interactions are possible. For example, the CDK utility may ask the vehicle to send the SERIAL_NOs of the certificates all at once and check that the vehicle is on the white list for all such certificates.

Replacement of Expired or Revoked Certificates Using Mobile Infrastructure Access Points:

Rather than deploy fixed roadside infrastructure to support security operations, this method takes advantage of infrastructure connectivity that already exists in trusted vehicles, such as police and emergency vehicles and public and private vehicle fleets, to relay security transactions. Trusted vehicles with back-end connectivity act as mobile infrastructure network access points to help relay messages between the CA and vehicles. Certificates assigned to a trusted vehicle can be distinguished from the general population so that another vehicle knows that it is communicating with a trusted vehicle. If a vehicle has a revoked certificate and encounters a trusted vehicle, it may broadcast a cryptographically secure request that the trusted vehicle relays over its infrastructure connection to the CA. The CA crafts a cryptographically secure response and sends it back to the trusted vehicle, which in turn broadcasts it out to the vehicle. To prevent user vehicle security traffic from overwhelming a trusted vehicle's infrastructure connectivity link, controls within the trusted vehicle relay assign vehicle traffic a low priority and only transmit it upon a bandwidth available basis. The trusted vehicle can also disable all user vehicle traffic relaying to obtain full use of the available infrastructure connectivity.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. A module may be a component of a device, software, program, or system that implements some "functionality", which can be embodied as software, hardware, firmware, electronic circuitry, or etc.

The terms "computer system" and "computer network" as used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server, and/or embedded system.

While there has been described and illustrated a system and method of digital key and certificate management for vehicle communications, PKI for vehicle communications, security, vehicle safety applications, and privacy, it will be apparent to those skilled in the art that modifications and variations are possible without deviating from the principles and broad teachings of the present invention which shall be limited solely by the scope of the claims appended hereto.

What is claimed is:

1. A method in a vehicle for replacing revoked certificates with replacement certificates that are placed on a Revoked Certificate Replacement List (RCRL) by a Certificate Authority (CA) and are encrypted with a symmetric key, the method comprising:

using one-way infrastructure-to-vehicle communications to receive the RCRL from the CA; and using a Symmetrically Encrypted Replacement Certificate List Certificate Decryption Key (CDK) Utility to replace the revoked certificates with the replacement certificates.

2. The method in accordance with claim 1, wherein the CDK utility is implemented as software generated by the CA and run on the vehicle.

3. The method in accordance with claim 1, wherein the CDK utility is used by the vehicle to validate that the vehicle on which the CDK utility is running has not been compromised and if not, the CDK utility allows the vehicle to process the RCRL by providing the symmetric key.

4. The method in accordance with claim 1, wherein the CDK utility is configured with:

a white list of non-misbehaving vehicles each of which has been assigned a certificate set, in which one or more certificates but not all of them have been revoked; and a black list of misbehaving vehicles each of which has been assigned a certificate set, in which one or more certificates but not all of them have been revoked.

5. The method in accordance with claim 4, wherein each item on the white and black list uniquely identifies a given certificate set, and is cryptographically generated.

6. The method in accordance with claim 1, wherein the CDK utility is further configured with a list of tuple {SERIAL_NO, RANDOM} where SERIAL_NO is a serial number of the revoked certificate to be replaced, and RANDOM is the random value used by the CA to generate the symmetric key to secure the replacement key.

7. The method in accordance with claim 1, wherein the CDK utility is digitally signed by the CA to allow vehicles to verify the authenticity of the CDK utility.

8. The method in accordance with claim 1, wherein both the symmetrically encrypted RCRL and CDK utility are distributed to vehicles using a one-way broadcast technique.

9. The method in accordance with claim 8, wherein the one-way broadcast method includes seeding with vehicle-to-vehicle distribution or satellite broadcast.

10. The method in accordance with claim 8, wherein the RCRL comprises:
    a list of SERIAL_NOs where SERIAL_NO is the serial number or a hash of the serial number of a revoked certificate being replaced; and
    a list of {NEW_CERT} k_sym containing a new anonymous private/public key pair, a corresponding anonymous certificate, and an Anonymous CA's digital signature on the key pair, all of which are symmetrically encrypted with key, k_sym.

11. The method in accordance with claim 10, wherein the key k_sym is generated by the CA by:
    concatenating a random value, RANDOM, to the SERIAL_NO of the certificate to be replaced to create a token, t;
    signing t with the private key of the certificate to be replaced to create a value, t_signed; and
    generating the symmetric key, k_sym, by running t_signed through a hashing algorithm.

12. The method in accordance with claim 1, wherein the CA generates a CERT_SET_ID by:
    ordering the certificates in a certificate set to which a certificate to be replaced belongs; and
    signing t_signed with the private key of each certificate in the certificate set in order.

13. The method in accordance with claim 12, wherein when a certificate to be replaced belongs to a certificate set that is determined to belong to a misbehaving vehicle, the certificate set's CERT_SET_ID is put on a black list, otherwise, the certificate set's CERT_SET_ID is put on a white list.

14. The method in accordance with claim 1, wherein the CA broadcasts the latest RCRL and CDK Utility for a predetermined period of time.

15. The method in accordance with claim 1, wherein each vehicle upon receiving the RCRL and CDK utility searches the RCRL to determine whether there is a serial number on the RCRL that matches one of the vehicle's certificates and checks the signature of the CDK utility to verify its authenticity and integrity.

16. The method in accordance with claim 1, wherein each vehicle upon successful verification of the CDK utility executes the CDK utility, and performs the following steps:
    1) the vehicle passes the SERIAL_NO of the certificate to replace;
    2) the CDK utility generates token, t, by concatenating the SERIAL_NO from the vehicle and RANDOM from a tuple {SERIAL_NO, RANDOM} whose SERIAL_NO matches SERIAL_NO from the vehicle;
    3) the CDK utility passes the generated token, t, to the vehicle so that the vehicle can sign t with the private key of the certificate to be replaced;
    4) the vehicle signs t with the private key of the certificate to be replaced (the signed token is referred to as t_signed);
    5) the vehicle creates a copy of t_signed and creates the CERT_SET_ID for the certificate set to which the certificate to be replaced belongs, and vehicle uses the same algorithm as the one used by the CA;
    6) the vehicle returns both t_signed and CERT_SET_ID to the CDK utility;
    7) the CDK utility checks the received CERT_SET_ID against its black list and if found, the CDK utility stops;
    8) the CDK utility checks the received CERT_SET_ID against its white list and if not found, the CDK utility stops;
    9) if the received CERT_SET_ID is found on the white list, the CDK utility generates a symmetric key, k_sym, by running the received t_signed through the same hash function as the one used by the CA;
    10) the CDK utility passes k_sym to the vehicle; and
    11) the vehicle uses k_sym to decrypt the replacement key from the RCRL.

17. The method in accordance with claim 1, wherein the vehicle receives a request from the CDK utility to send the SERIAL NOs of the certificates all at once and checks that the vehicle is on the white list for all such certificates.

* * * * *